US012720023B2

(12) United States Patent
Matsumoto

(10) Patent No.: US 12,720,023 B2
(45) Date of Patent: Aug. 25, 2026

(54) DISPLAY METHOD, PROJECTOR, AND NON-TRANSITORY COMPUTER-READABLE STORAGE MEDIUM STORING PROGRAM

(71) Applicant: SEIKO EPSON CORPORATION, Tokyo (JP)

(72) Inventor: Morio Matsumoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 321 days.

(21) Appl. No.: 18/384,416

(22) Filed: Oct. 27, 2023

(65) Prior Publication Data

US 2024/0146884 A1 May 2, 2024

(30) Foreign Application Priority Data

Oct. 28, 2022 (JP) ................................ 2022-173073

(51) Int. Cl.
*H04N 9/31* (2006.01)

(52) U.S. Cl.
CPC ......... *H04N 9/3147* (2013.01); *H04N 9/3105* (2013.01); *H04N 9/3188* (2013.01)

(58) Field of Classification Search
CPC .. H04N 9/3105; H04N 9/3141; H04N 9/3147; H04N 9/3185; H04N 9/3188; H04N 9/3197; G03B 21/005; G03B 21/006; G03B 21/008; G03B 21/13; G03B 21/28; G03B 21/145; G03B 21/147; G03B 21/208; G03B 21/2053
See application file for complete search history.

(56) References Cited

U.S. PATENT DOCUMENTS 8,267,523 B2 * 9/2012 Kondo ................. H04N 9/3194 353/31
9,071,773 B2 * 6/2015 Oka ................... H04N 21/4854
2006/0181685 A1 * 8/2006 Hasegawa .............. G03B 37/04 353/69
2015/0138240 A1 5/2015 Hiranuma
2017/0208304 A1 * 7/2017 Furui ................... H04N 9/3182
2019/0073753 A1 3/2019 Yamauchi
2019/0130541 A1 5/2019 Kudo et al.

FOREIGN PATENT DOCUMENTS

JP 2007-166466 A 6/2007
JP 2015-121779 A 7/2015
JP 2016-163228 A 9/2016
JP 2017-191973 A 10/2017
JP 2019-047311 A 3/2019
JP 2019-109268 A 7/2019
JP 2021-184625 A 12/2021

* cited by examiner

*Primary Examiner* — Sultan Chowdhury
(74) *Attorney, Agent, or Firm* — Oliff PLC

(57) ABSTRACT

A display method including an adjustment of a combined image includes receiving selection of information representing a size of a projection range when performing tiling projection of a first image projected using a first projector and a second image projected using a second projector, projecting a third image including a pattern representing a width of an overlapping area based on the information representing the size of the projection range using the first projector, and projecting a fourth image including a pattern representing the width of the overlapping area using the second projector.

5 Claims, 11 Drawing Sheets

Sc
55
52
52b
51b
51
60
[SIMPLE TILING]
(1) PLEASE ADJUST POSITIONS SO THAT A GREEN PATTERN AND A MAGENTA PATTERN OVERLAP EACH OTHER. THE OVERLAPPING PORTION TURNS TO A WHITE PATTERN.
(2) WHEN THE ALIGNMENT IS COMPLETED. PLEASE PRESS "YES."
YES
NO
UNDO:UNDO SELECT DECIDE MENU:END
115
114
100b
100a
28b
28a
18b
18a
71
72
92b
91b
95b
92a
91a
95a
85
81
80
90
110
200

40

IMAGE QUALITY
PICTURE
CONFIGURATION
EXTENDED CONFIGURATION
NETWORK
INFORMATION
INITIALIZATION

41

[MULTI-PROJECTION]
UNDO
PROJECTOR ID OFF
LAYOUT SETUP
GEOMETRIC DISTORTION CORRECTION POINT CORRECTION
EDGE BLENDING
SCREEN MATCHING
SIMPLE STACKING
SIMPLE TILING ⏎

42

[UNDO]:UNDO [⬍]:SELECT [⏎]: DECIDE [ MENU ]: END

| REFERENCE PANEL RESOLUTION | :W1 | 1920 |
|---|---|---|
| REFERENCE PANEL RESOLUTION | :H | 1200 |

[ Pixel ]

| COMBINATION ASPECT RATIO | | COMBINED SCREEN WIDTH : W3 | COMBINED SCREEN HEIGHT : H | BLEND WIDTH : W2 | EDID STANDARD | |
|---|---|---|---|---|---|---|
| | | | | | EDID WIDTH : EW | EDID HEIGHT : EH |
| 21 | 9 | 2866 | 1200 | 974 | 3440 | 1440 |
| 21 | 9 | 2844 | 1200 | 996 | 2560 | 1080 |
| 16 | 9 | 3200 | 1200 | 640 | 1920 | 720 |
| 3 | 1 | 3600 | 1200 | 240 | 3240 | 1080 |
| 32 | 10 | 3840 | 1200 | 0 | 3840 | 1200 |

Sc
55
52
51b,52b
51
200
115
114
100b
100a
71
72
28b
28a
18b
18a
92b
91b
95b
85
92a
91a
95a
83
82
120
80
90
110

DISPLAY METHOD, PROJECTOR, AND NON-TRANSITORY COMPUTER-READABLE STORAGE MEDIUM STORING PROGRAM

The present application is based on, and claims priority from JP Application Serial Number 2022-173073, filed Oct. 28, 2022, the disclosure of which is hereby incorporated by reference herein in its entirety.

BACKGROUND

1. Technical Field

The present disclosure relates to a display method, a projector, and a non-transitory computer-readable storage device storing a program.

2. Related Art

There has been known an image projection system for realizing a large image using projection images of a plurality of projectors. According to that system, by arranging the plurality of projection images in a matrix, it is possible to perform tiling projection for obtaining an image larger than each of the images. When performing such tiling projection, since it is necessary to align the positions of the projection images from the plurality of projectors, a variety of alignment methods are proposed.

In, for example, JP-A-2021-184625 (Document 1), it is arranged that a user can figure out how much a first image is required to overlap a second image by projecting a first pattern on an end portion of the first image and projecting a second pattern different in color from the first pattern so that a part of the second pattern is located at a position distant as much as at least a first distance from the end portion in a display projection system for projecting a plurality of images side by side with a plurality of projectors to display a single large image. Further, according to Document 1, the first distance corresponds to a blend width as a width of an overlapping area in which the two images overlap each other, and the blend width is designated by the user. Thus, the time and effort in installing the projectors are reduced.

However, in the method of Document 1, it is necessary for the user to designate the blend width, but it is difficult for an ordinary user to easily designate the blend width. In particular, there is a problem that the setup is difficult unless the characteristics due to the difference in blend width are understood such as a problem that the smoothness in joints between the images is spoiled when the blend width is too narrow, or a problem that when the blend width is too wide, the projection range becomes small to degrades the image quality.

In other words, there is demanded a display method capable of easily achieving the display setup of the tiling projection.

SUMMARY

A display method according to an aspect of the present disclosure includes receiving selection of information representing a size of a projection range when performing tiling projection of a first image projected using a first projector and a second image projected using a second projector, projecting a third image including a pattern representing a width of an overlapping area based on the information representing the size of the projection range using the first projector, and projecting a fourth image including a pattern representing the width of the overlapping area using the second projector.

A projector as an aspect of the display method according to the present disclosure includes an optical device, and at least one processor, wherein the at least one processor is configured to execute receiving selection of information representing a size of a projection range when performing tiling projection by combining a first image and a second image projected using another projector, and displaying a third image including a pattern representing a width of an overlapping area based on the information representing the size of the projection range by controlling the optical device.

A non-transitory computer-readable storage medium storing a program as an aspect of the display method according to the present disclosure, the program causing a computer to execute receiving selection of information representing a size of a projection range when performing tiling projection of a first image projected using a first projector and a second image projected using a second projector, causing the first projector to project a third image including a pattern representing a width of an overlapping area based on the information representing the size of the projection range, and causing the second projector to project a fourth image including a pattern representing the width of the overlapping area.

BRIEF DESCRIPTION OF THE DRAWINGS

FIG. 7 is a diagram showing an aspect of a layout setup screen.

FIG. 8 is a diagram showing an aspect of an aspect setup screen.

FIG. 12 is a list showing a correlative relationship between a combination aspect ratio and a blend width.

DESCRIPTION OF EMBODIMENTS

Embodiment 1

General Description of Image Projection System

Figure 1:
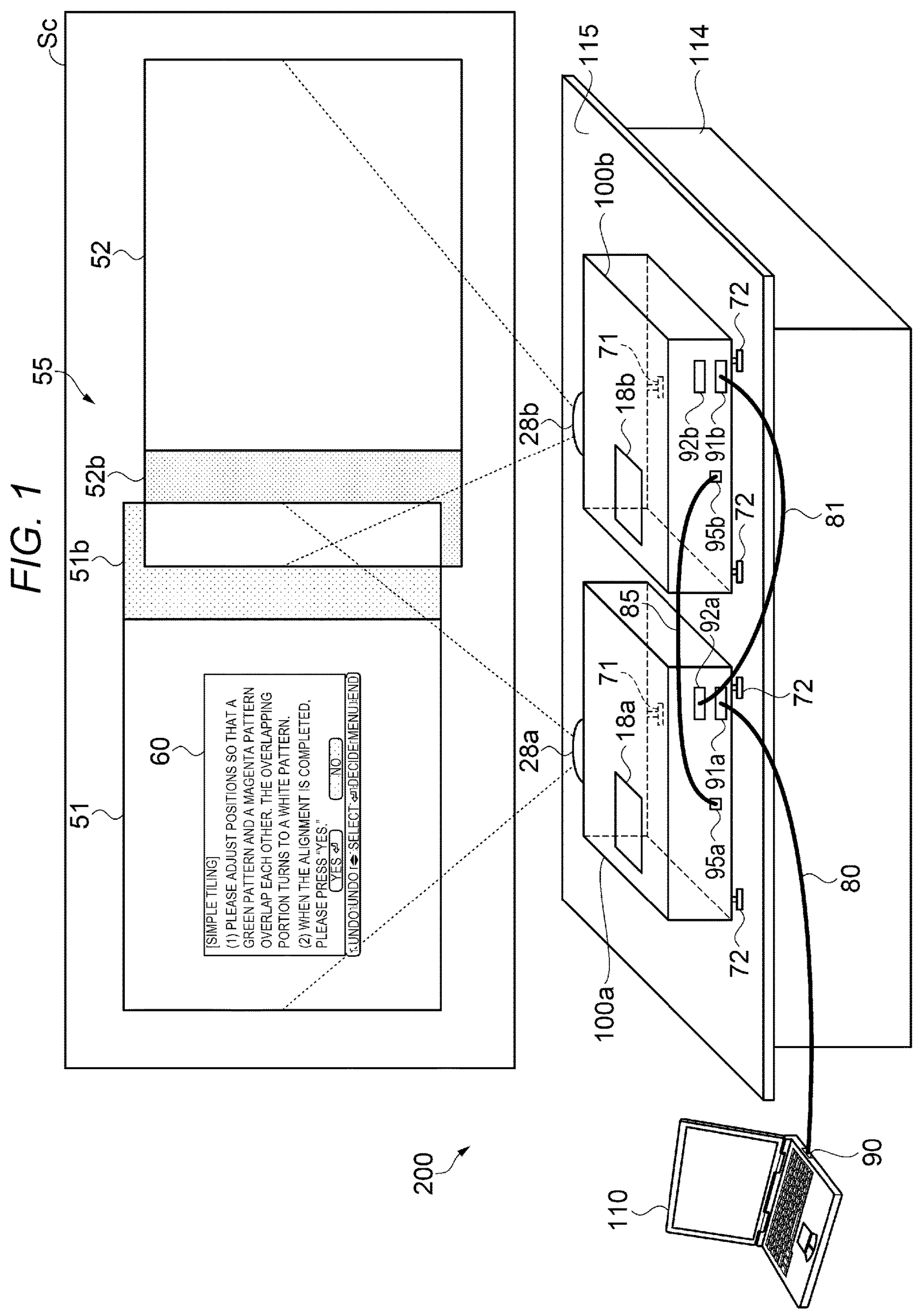
FIG. 1 is a schematic configuration diagram of an image projection system according to Embodiment 1.

FIG. 1 is a schematic configuration diagram of an image projection system according to the present embodiment.

An image projection system 200 is constituted by a projector 100*a* as a first projector, a projector 100*b* as a second projector, a computer 110 as an image signal supply device, and so on.

As shown in FIG. 1, the image projection system 200 arranges a first image 51 projected by the projector 100*a* and a second image 52 projected by the projector 100*b* horizontally side by side on a screen Sc to thereby project a combined image 55 as a landscape image. It should be noted that since FIG. 1 shows a state of performing the alignment of the first image 51 and the second image 52, the both images are not uniformed in height to create a state in which a step is formed in a joint. It should be noted that in the present embodiment, projecting two images side by side in such a manner is referred to as tiling projection. Although two images are projected side by side in the tiling projection in the present embodiment, it is possible to adopt an aspect in which three or more images are projected side by side.

In FIG. 1, the projector 100*a* and the projector 100*b* are arranged horizontally side by side on an installation surface 115 of an installation platform 114 in a state in which respective optical devices 28 of the projectors face to the screen Sc. In a preferred example, as the projector 100*a* and the projector 100*b*, there are used the same projectors. As the installation platform 114, there can be used, for example, a table, and it is sufficient for the installation platform 114 to be provided with the flat installation surface 115, and it is possible to use, for example, a cabinet. Further, although the screen Sc is set along a wall in a room where the installation platform 114 is installed, direct projection on a wall surface can also be adopted.

Although described later in detail, in FIG. 1, the projector 100*a* is used as a main projector, and a display setup in the tiling projection is performed with the projector 100*b* as a secondary projector so that the combined image 55 becomes a consecutive and smooth image.

The projector 100*a* and the projector 100*b* are coupled to each other with a LAN (Local Area Network) cable 85. In particular, a LAN terminal 95*a* of the projector 100*a* and a LAN terminal 95*b* of the projector 100*b* are coupled to each other with the LAN cable 85.

The projector 100*a* is provided with an HDMI (a registered trade mark, High-Definition Multimedia Interface) terminal 91*a* for input, and an HDMI terminal 92*a* for output. Similarly, the projector 100*b* is also provided with an HDMI terminal 91*b* for input and an HDMI terminal 92*b* for output.

The HDMI terminal 91*a* for input of the projector 100*a* and an HDMI terminal 90 for output of the computer 110 are coupled to each other with an HDMI cable 80. Thus, the projector 100*a* is supplied with an image signal from the computer 110.

The HDMI terminal 92*a* for output of the projector 100*a* and the HDMI terminal 91*b* for input of the projector 100*b* are coupled to each other with an HDMI cable 81. In other words, a daisy chain connection is established between the projector 100*a* and the projector 100*b* with the HDMI cable 81. It should be noted that the daisy chain connection is not a limitation, and any connection method capable of supplying a common image signal to the projectors 100*a*, 100*b* will do.

Schematic Configuration of Projector

Figure 2:
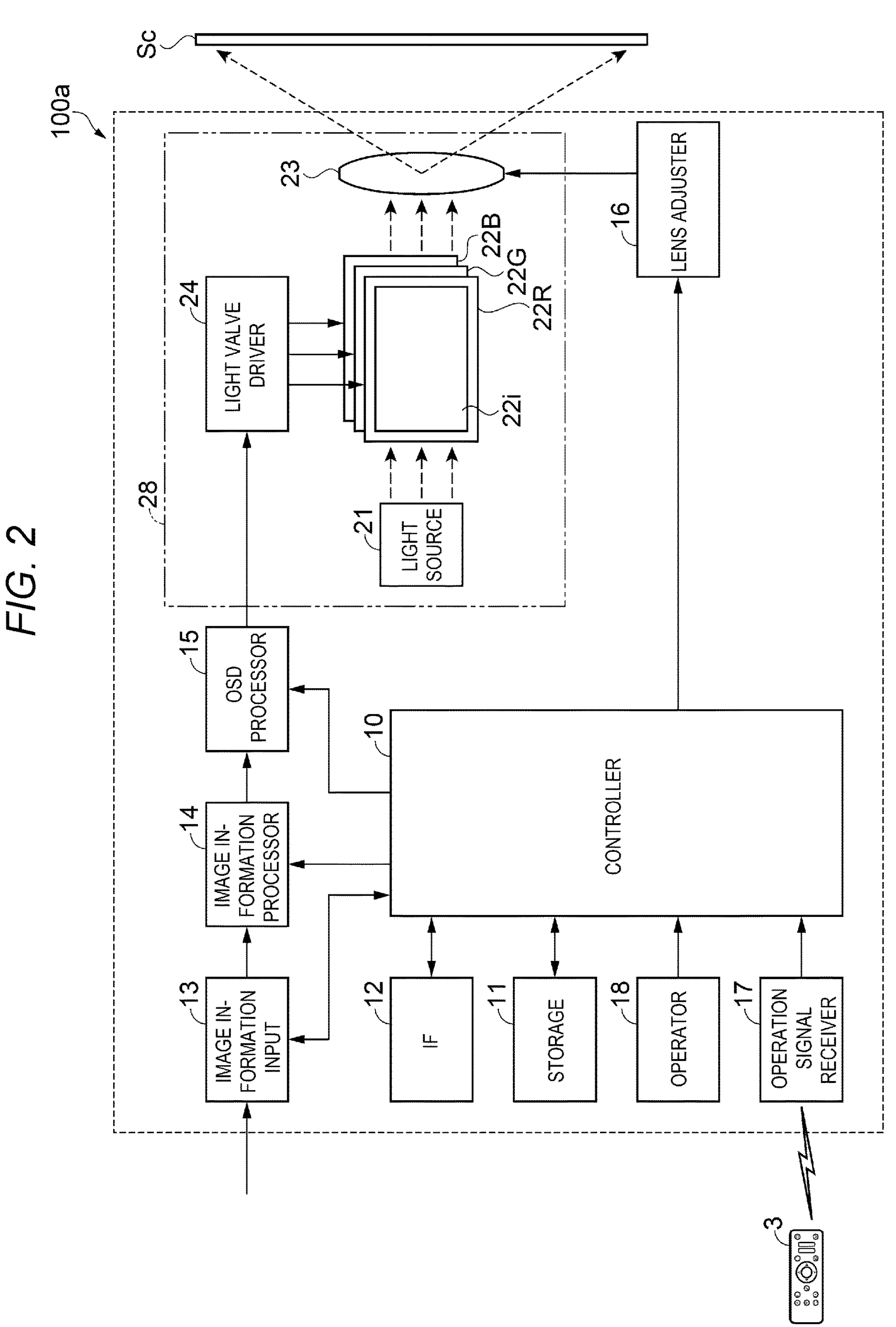
FIG. 2 is a block diagram showing a schematic configuration of a projector.
Figure 3:
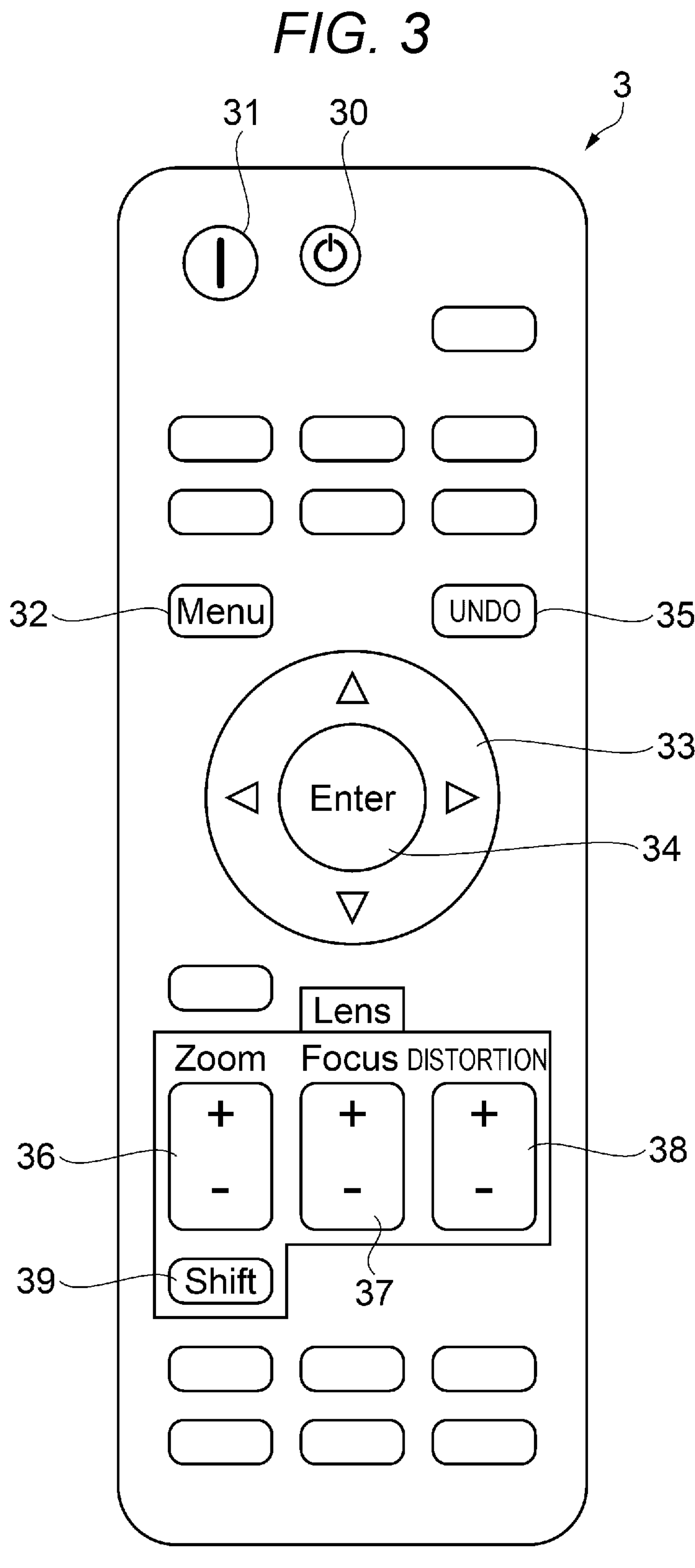
FIG. 3 is a plan view of a remote controller.

FIG. 2 is a block diagram showing a schematic configuration of the projector. FIG. 3 is a plan view of a remote controller.

Since the same projectors are used as the projectors 100*a*, 100*b* as described above, a configuration of the projector 100*a* will be described as a representative.

As shown in FIG. 2, the projector 100*a* is constituted by a controller 10, a storage 11, an IF 12, an image information input 13, an image information processor 14, an OSD processor 15, an optical device 28, a lens adjuster 16, an operation signal receiver 17, an operator 18, and so on.

The controller 10 is configured including a single processor or a plurality of processors, and operates with a control program stored in the storage 11 to thereby integrally control the operation of the projector 100*a*. The controller 10 is formed of a central processing device (CPU: Central Processing Unit) including, for example, an interface with peripheral devices, an arithmetic device, and registers. It should be noted that some or all of the functions of the controller 10 can also be realized by hardware such as a DSP (Digital Signal Processor), an ASIC (Application Specific Integrated Circuit), a PLD (Programmable Logic Device), or an FPGA (Field Programmable Gate Array). The controller 10 executes a variety of types of processing in parallel or in sequence.

The storage 11 is configured including a RAM (Random Access Memory) and a ROM (Read Only Memory). The RAM is used for temporary storage of a variety of types of data, and the ROM stores the control program for controlling the operation of the projector 100*a*, associated data, and so on. The control program stores a start-up program for instructing a sequence and contents of the processing when starting up the projector 100*a*, an adjustment program of the combined image in the tiling projection, and so on. The associated data includes a configuration table stipulating the aspect ratio and the blend width of the combined image, and so on. Further, since the projector 100*a* is loaded with an EDID (Extended Display Identification Data) function, a program and associated data related to that function are also stored in the storage 11. The aspect ratio corresponds to information representing a size of the projection range. Further, it is possible to use the resolution of the combined image instead of the aspect ratio.

It should be noted that the controller 10 and the storage 11 correspond to a computer, and execute the adjustment program of the combined image described above. Further, it is also possible for the computer 110 to execute the adjustment program of the combined image.

The IF 12 is an interface portion with external devices, and is provided with a plurality of coupling terminals including the HDMI terminals 91*a*, 92*a*, and the LAN terminal 95*a* (FIG. 1) described above. As the plurality of coupling terminals, there can further be provided with, for example, a USB (Universal Serial Bus) terminal or a VGA (Video Graphics Array) terminal.

The image information input 13 is supplied with the image information such as the image signal from an external image signal supply device such as the computer 110. In the present embodiment, the image information is input from the HDMI terminal 91*a* for input of the IF 12. Further, when the image information input 13 is supplied with a pattern image for alignment and so on from the controller 10, the image information input 13 performs necessary image processing, and then outputs the image information having been processed to the image information processor 14. It should be noted that the image signal supply device is not limited to the computer, any devices capable of supplying the image information will do, and it is possible to adopt, for example, a BD (Blu-ray (a registered trademark) Disc) player or a streaming medium player.

Based on the control by the controller 10, the image information processor 14 performs necessary image processing on the image information input from the image information input 13, and then outputs the image information having been processed to the OSD processor 15.

Based on the control by the controller 10, the OSD processor 15 performs processing for displaying an OSD (On-Screen Display) image such as a message image, and a menu image so as to be superimposed on the image. The OSD processor 15 is provided with an OSD memory not shown, and stores OSD image information representing figures, fonts, and so on for forming the OSD image, a shape, an arrangement, color information, and so on of a strip pattern described later. When the controller 10 instructs the superimposition of the OSD image, the OSD processor 15 reads out the necessary OSD image information from the OSD memory, and then combines the OSD image information with the image information input from the image information processor 14 so that the OSD image is superimposed at a predetermined position on the image.

The optical device 28 is constituted by a light source 21, three liquid crystal light valves 22R, 22G, and 22B as light modulation devices, a projection lens 23 as a projection optical system, a light valve driver 24, and so on. The optical device 28 modulates the light emitted from the light source 21 with the liquid crystal light valves 22R, 22G, and 22B to form image light, and then projects the image light as full-color image light from the projection lens 23 to the screen Sc.

The light source 21 is configured including a solid state light source such as a light emitting diode or a semiconductor laser. It should be noted that it is possible to use a discharge-type light source lamp such as a super-high pressure mercury lamp or a metal halide lamp. The light emitted from the light source 21 is converted into the light having a substantially uniform intensity distribution by an integrator optical system not shown, and is then separated into colored light components of red (R), green (G), and blue (B), the three primary colors of light, by a color separation optical system not shown, and then the colored light components respectively enter the liquid crystal light valves 22R, 22G, and 22B.

The liquid crystal light valves 22R, 22G, and 22B are each formed of a transmissive liquid crystal panel having a liquid crystal material encapsulated between a pair of transparent substrates, and so on. The liquid crystal panels are each provided with a rectangular image forming area 22*i* constituted by a plurality of pixels arranged in a matrix, and are each arranged so that a drive voltage can be applied to the liquid crystal material pixel by pixel.

The light valve driver 24 forms an image in the image forming area 22*i* of each of the liquid crystal light valves 22R, 22G, and 22B. Specifically, the light valve driver 24 applies the drive voltages corresponding to the image information input from the OSD processor 15 to the respective pixels in the image forming area 22*i* to thereby set the pixels to respective light transmittances corresponding to the image information. The light emitted from the light source 21 is transmitted through the image forming area 22*i* of each of the liquid crystal light valves 22R, 22G, and 22B to thereby be modulated pixel by pixel, and thus the image light corresponding to the image information is formed for each of the colored light beams. The image light beams of the respective colors thus formed are combined with each other pixel by pixel by a color composition optical system not shown to turn to the image light beam representing a color image, and the image light beam representing the color image is then projected on the screen Sc in an enlarged manner by the projection lens 23.

It should be noted that although those use the transmissive liquid crystal light valves 22R, 22G, and 22B as the light modulation devices are described above, it is also possible to use reflective light modulation devices such as reflective liquid crystal light valves. Further, it is possible to use a digital mirror device or the like for controlling the emission direction of the incident light for every micromirror as a pixel to thereby modulate the light emitted from the light source 21. Further, the configuration provided with the plurality of light modulation devices for the respective colored light beams is not a limitation, and it is also possible to adopt a configuration of modulating the plurality of colored light beams with a single light modulation device in a time-sharing manner.

Further, the image information input 13, the image information processor 14, and the OSD processor 15 can be formed of a single processor, a plurality of processors, or the like, or can also be formed of a dedicated processing device such as an ASIC (Application Specific Integrated Circuit) or an FPGA (Field Programmable Gate Array).

The projection lens 23 is configured including a plurality of concavoconvex lenses, and specific lenses in the plurality of concavoconvex lenses are attached with actuators for a zoom adjustment, a focus adjustment, and a lens shift. As the actuators, linear actuators including motors such as piezoelectric motors and so on are suitable.

The lens adjuster 16 is provided with drive circuits for driving these actuators, and performs the zoom adjustment, the focus adjustment, and the lens shift adjustment in accordance with the instructions from the controller 10. In the lens shift adjustment, the projection lens 23 is moved from side to side and up and down on a surface substantially perpendicular to the central optical axis of the projection lens 23.

The operation signal receiver 17 receives the operation signal using infrared communication from a remote controller 3, decodes the operation signal, and then transmits the result to the controller 10. It should be noted that the infrared transmission is not a limitation, and any configuration capable of performing Near Field Communication will do, and for example, it is possible for the remote controller 3 and the operation signal receiver 17 to have a configuration provided with a communication device compliant with Bluetooth (a registered trademark).

As shown in FIG. 3, the remote controller 3 is provided with a plurality of operation buttons including a power key 30 for switching the power of the projector 100*a* between ON and OFF, and a projection key 31 for starting the projection in a standby state.

The plurality of operation buttons includes a menu key 32, a selection key 33, a decision key 34, an undo key 35, a zoom key 36, a focus key 37, a distortion correction key 38, and a lens shift key 39.

Figures 5, 6:
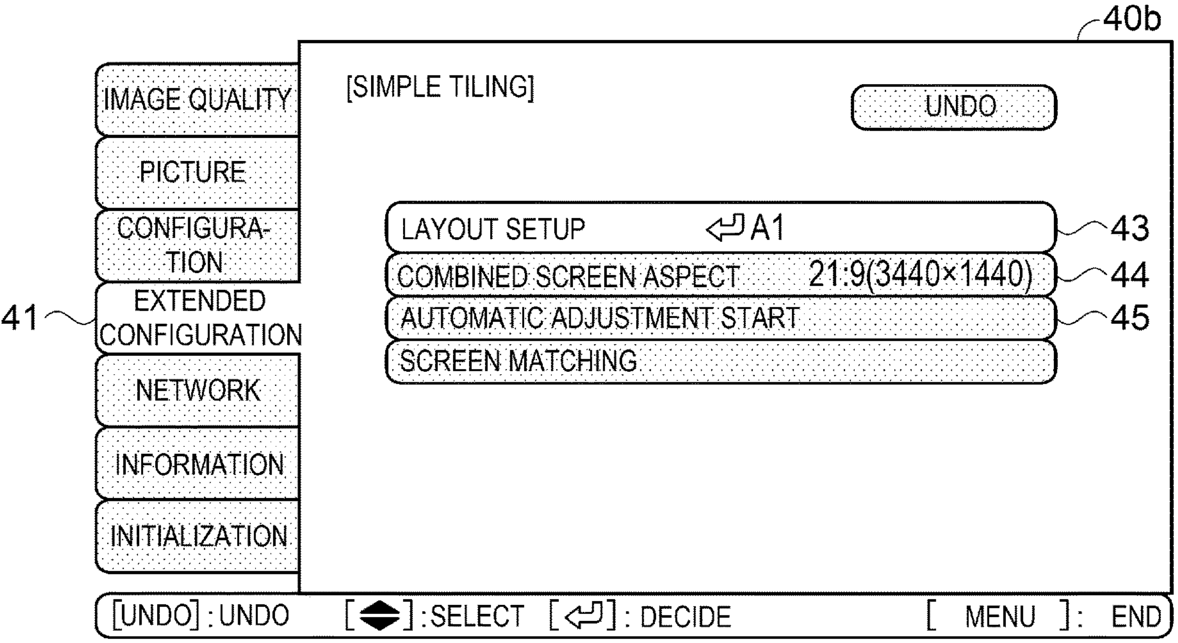
FIG. 5 is a diagram showing an aspect of an image showing an environmental setup menu.
FIG. 6 is a diagram showing an aspect of an image showing an environmental setup menu.

The menu key 32 is an operation key for displaying the menu image in the first image 51 (FIG. 1). When pressing the menu key 32, an image 40 showing an environmental setup menu shown in FIG. 5 is superimposed on the first image 51.

The selection key 33 is a ring-like cross key to be used when selecting an item which needs to be executed from the menu screen and so on, and is disposed so as to be able to select the items at the left, right, top, and bottom sides.

The decision key 34 is a circular button disposed at the center of the selection key 33, and is held down when executing the item selected by the selection key 33.

The undo key 35 is an operation button for restoring the state in which the last operation has not been performed.

The zoom key 36 is a key for performing the zoom adjustment of the first image 51 (FIG. 1) with the lens adjuster 16, and is a vertically-long button provided with two operators. An upper part of the zoom key 36 functions as a positive button, and a lower part thereof functions as a negative button, and when pressing the positive part, the image expands, and when pressing the negative part, the image contracts.

The focus key 37 is a key for performing the focus adjustment of the first image 51 with the lens adjuster 16, and is provided with a positive button in the upper part, and a negative button in the lower part similarly to the zoom key 36. By pressing the positive part or the negative part, the focal position of the image is adjusted.

The distortion correction key 38 is a key for correcting the distortion of the first image 51, and is provided with a positive button in the upper part, and a negative button in the lower part similarly to the zoom key 36. By pressing the positive part or the negative part, the distortion condition of the image is controlled.

Figure 14:
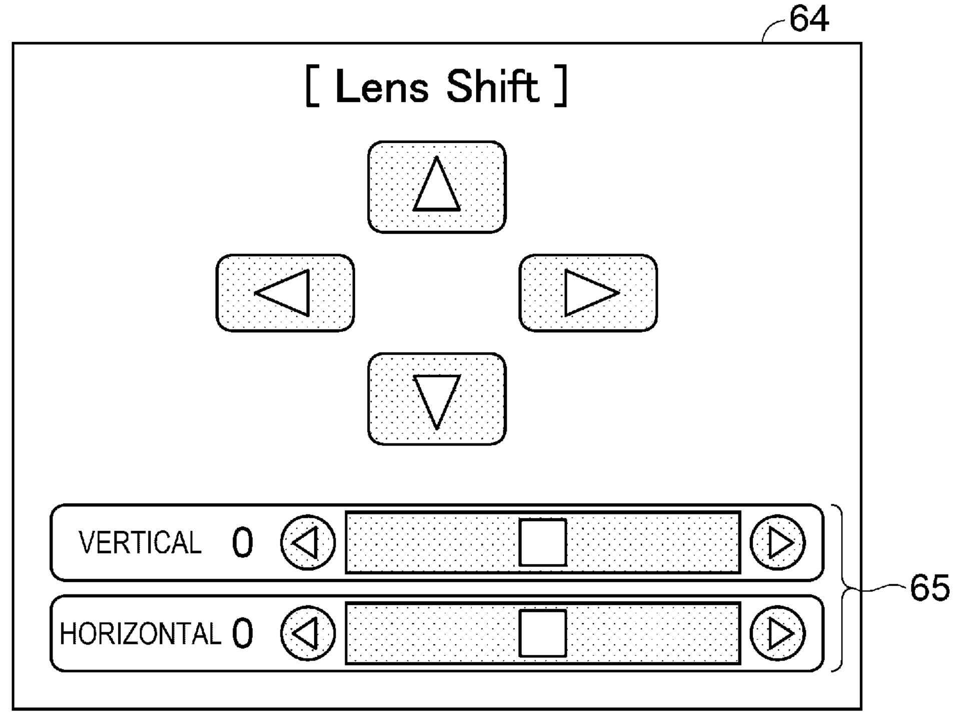
FIG. 14 is a diagram showing an aspect of a screen for an adjustment in a lens shift adjustment.

The lens shift key 39 is used when moving the position of the first image 51 with the lens shift adjustment function of the lens adjuster 16, and when that key is operated, an image 64 for adjusting the lens shift shown in FIG. 14 is superimposed on the first image 51.

Going back to FIG. 2, the operator 18 is an operator provided to a main body of the projector 100*a* (FIG. 1), and is provided with a plurality of operation keys similar to those of the remote controller 3.

Method of Adjusting Combined Image

Figure 4:
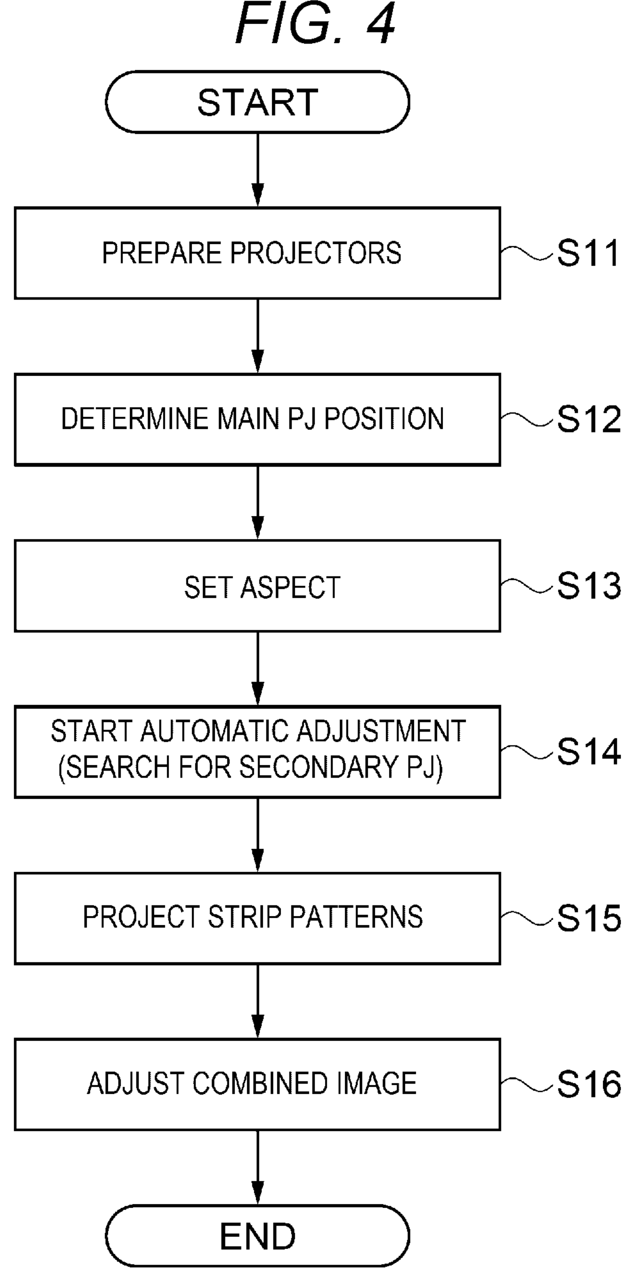
FIG. 4 is a flowchart showing a flow of a method of adjusting a combined image.
Figures 7, 8:
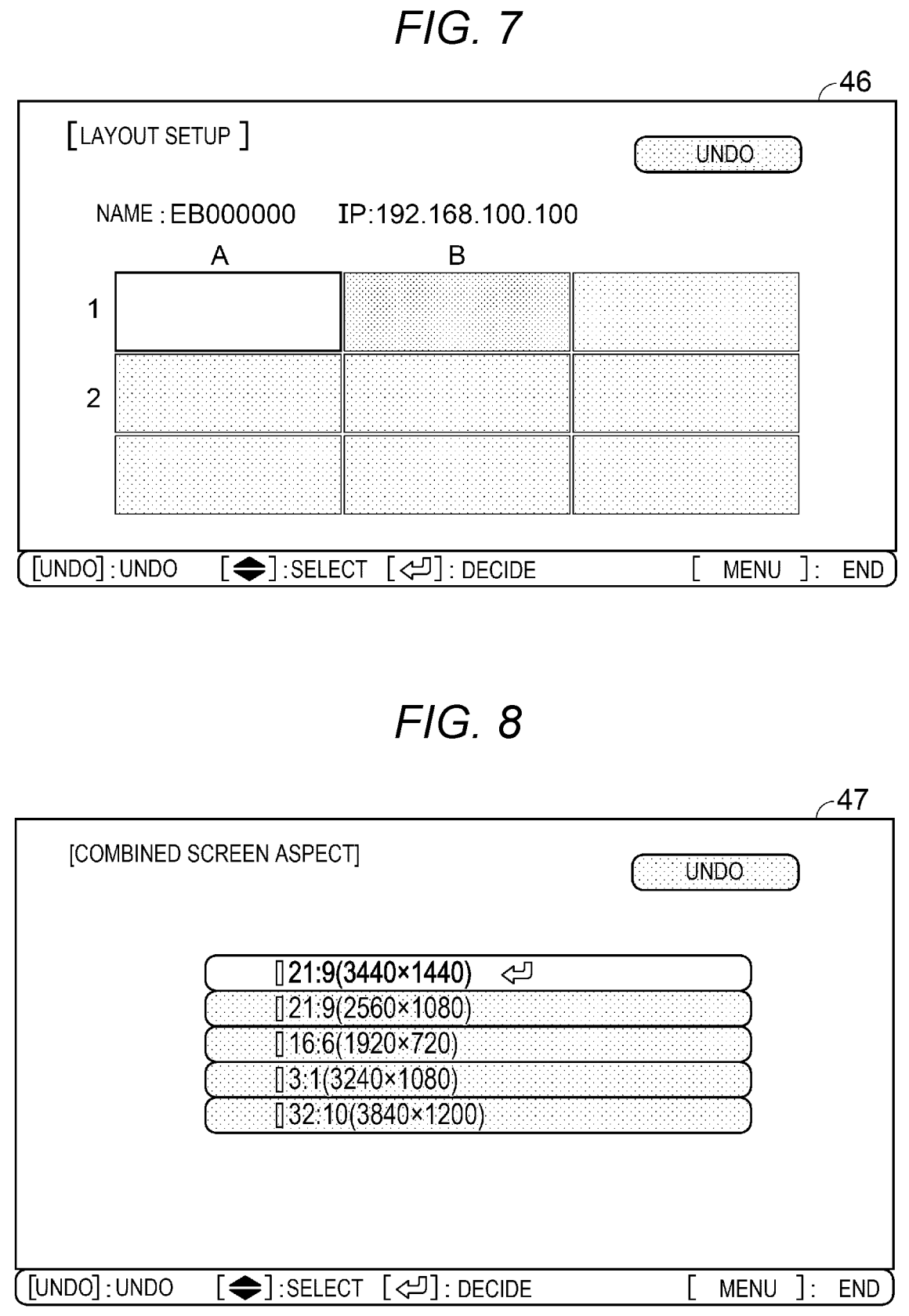
Figure 9:
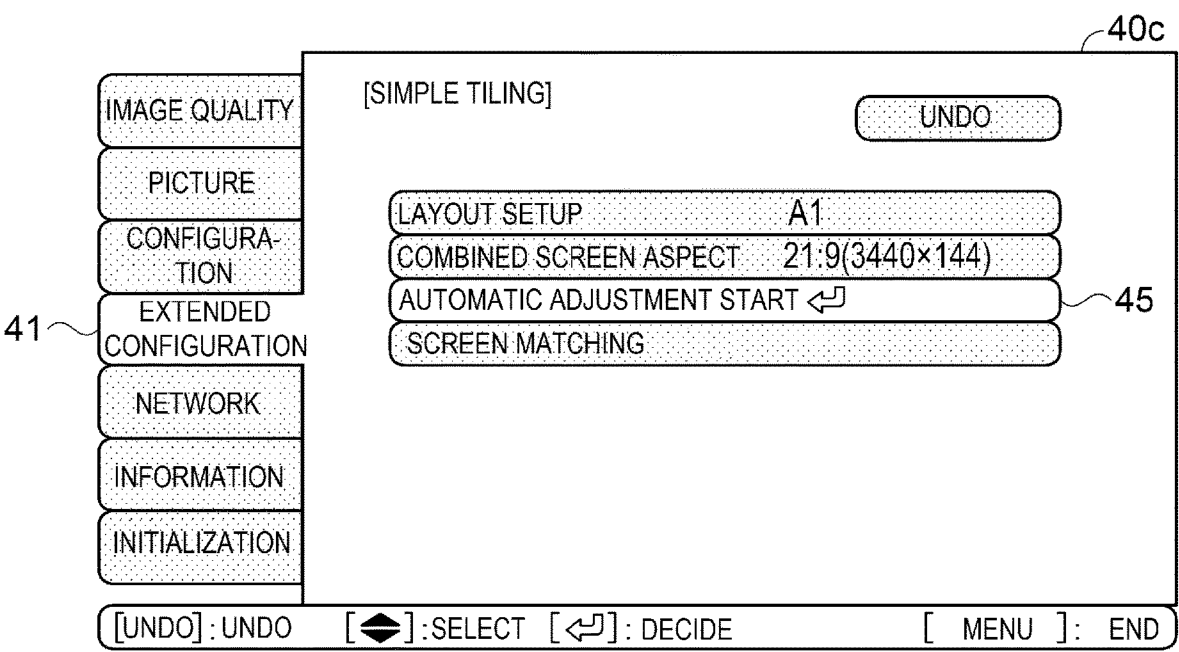
FIG. 9 is a diagram showing an aspect of an image showing an environmental setup menu.
Figure 10:
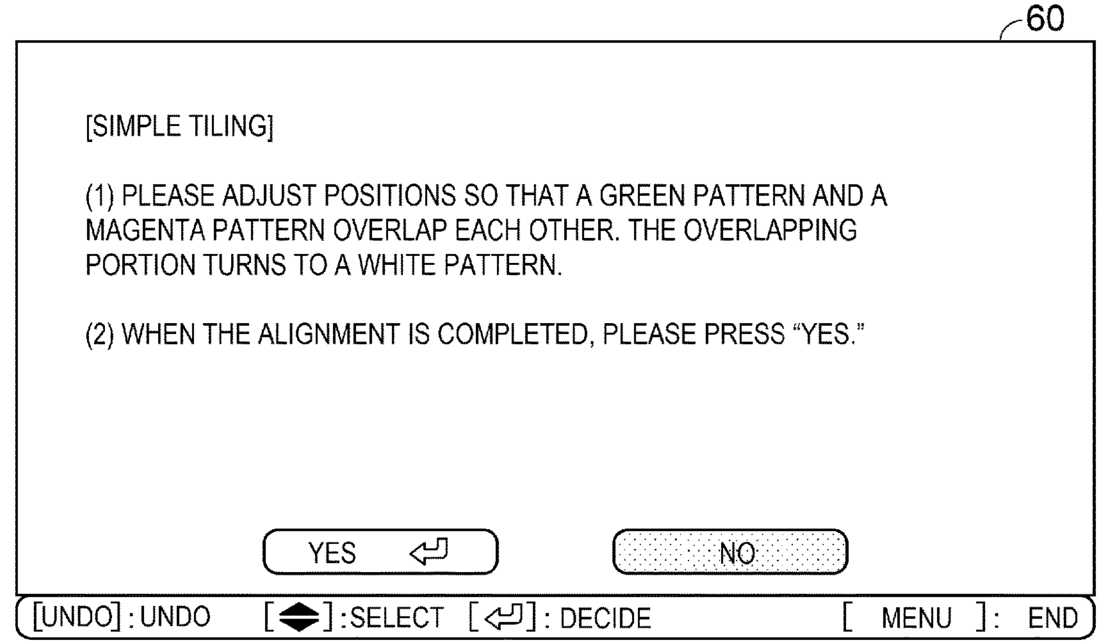
FIG. 10 is a diagram showing an aspect of a screen in a combined image adjustment.

FIG. 4 is a flowchart showing a flow of a method of adjusting the combined image in the tiling projection. FIG. 5, FIG. 6, and FIG. 9 are diagrams showing an aspect of an image showing the environmental setup menu. FIG. 7 is a diagram showing an aspect of a layout setup screen. FIG. 8 is a diagram showing an aspect of an aspect setup screen. FIG. 10 is a diagram showing an aspect of a screen in a combined image adjustment.

Here, the flow of the method of adjusting the combined image in the tiling projection in the image projection system 200 will be described with reference mainly to FIG. 4 arbitrarily including other diagrams. It should be noted that the method of adjusting the combined image is also referred to as a display method.

In the step S11, the image projection system 200 including the projectors 100*a*, 100*b*, and the computer 110 is prepared. Specifically, as shown in FIG. 1, the user sets the projectors 100*a*, 100*b* so as to be arranged side by side on the installation surface 115 of the installation platform 114. The projector 100*a* and the projector 100*b* are coupled to each other with the LAN cable 85. Further, the computer 110 and the projector 100*a* are coupled to each other with the HDMI cable 80, and the projector 100*a* and the projector 100*b* are coupled to each other with the HDMI cable 81, and then, the projectors 100*a*, 100*b* are powered ON.

The user adjusts legs 71, 72 located below the main body to perform a coarse adjustment of the projection position so that the first image 51 projected by the projector 100*a* and the second image 52 projected by the projector 100*b* are substantially arranged horizontally side by side as shown in FIG. 1.

In the step S12, the position of the main projector in the tiling projection is determined. First, when the user presses the menu key 32 of the remote controller 3, the image 40 as a menu image for a projection environmental setup shown in FIG. 5 is superimposed on the first image 51.

As shown in FIG. 5, setup items are arranged at the left side of the image 40, namely an image quality, a picture, a configuration, an extended configuration 41, a network, information, and initialization from above, and there is created a state in which the extended configuration 41 is selected by default. In the right part of the image 40, there are arranged setup items of the extended configuration 41, and a projector ID, a layout setup, a geometric distortion correction, edge blending, screen matching, simple stacking, and simple tiling 42 are displayed from above. Here, in order to form the combined image 55 as a horizontally elongated image, the user operates the selection key 33 of the remote controller 3 to select the simple tiling 42, and then holds down the decision key 34.

When the simple tiling 42 is executed, the adjustment program of the combined image in the tiling projection is started up. After the start-up, the screen makes the transition to be switched to an image 40*b* shown in FIG. 6.

In the image 40*b*, there are arranged the setup items of the simple tiling, and a layout setup 43, a combined screen aspect 44, an automatic adjustment start 45, and screen matching are displayed from above. Here, in order to determine the main projector and the secondary projector, the user operates the selection key 33 of the remote controller 3 to select the layout setup 43, and then holds down the decision key 34. When executing the layout setup 43, the screen makes the transition to be switched to an image 46 shown in FIG. 7.

The image 46 shown in FIG. 7 is displayed based on a positional relationship between the first image 51 to be projected by the projector A, and the second image 52 projected by the projector B, the first image 51 and the second image 52 constituting the simple tiling. In the present embodiment, the projector A for projecting the first image 51 is arranged at the left, the projector B for projecting the second image 52 is arranged at the right, which are displayed in a selectable manner.

Here, in order to set the projector A at the left side as the main projector, the user operates the selection key 33 of the remote controller 3 to select the projector A, and then holds down the decision key 34. Thus, a projector 110*a* (FIG. 1) corresponding to the projector A is determined as the main projector. At the same time, a projector 110*b* becomes the secondary projector. It should be noted that it is possible to set the projector B as the main projector. When selecting and then determining the projector A, the screen makes the transition to return to the image 40*b* shown in FIG. 6. In the present embodiment, the position information includes information representing the fact that the projector B is arranged at the right side of the projector A. The position information can include information related to which one of the projectors is the main projector. Further, the position information can be information representing an arrangement place of the projector or the image to be projected. For example, the position information can include information that the projector A is arranged at the first row and the A-th column shown in FIG. 7, and the projector B is arranged at the first row and the B-th column.

In the step S13, the aspect ratio of the combined screen is set. In the image 40*b* shown in FIG. 6, the user operates the selection key 33 of the remote controller 3 to select the combined screen aspect 44, and then holds down the decision key 34. When the combined screen aspect 44 is executed, the screen makes the transition to be switched to an image 47 shown in FIG. 8. It should be noted that the aspect ratio is an example of the information representing the size of the projection range, and is not a limitation, and it is possible to use, for example, the resolution of the combined image as the information representing the size of the projection range. In other words, in the step S13, the information representing the size of the projection range is set.

The user selects the desired aspect ratio, and then decides the selection. In the case of the image 47 shown in FIG. 8, the user operates the selection key 33 of the remote controller 3 to select the aspect ratio of 21:9 (3440×1440), and then holds down the decision key 34. Thus, the aspect ratio of the combined screen is set. When a combination aspect ratio is set, the screen makes the transition to be switched to an image 40*c* shown in FIG. 9.

In the step S14, there are performed a search for the secondary projector, and a calculation of the blend width suitable for the combination aspect ratio.

In the image 40*c* shown in FIG. 9, the user operates the selection key 33 of the remote controller 3 to select the automatic adjustment start 45, and then holds down the decision key 34. Thus, the automatic adjustment starts, and first, the secondary projector for performing the tiling projection in cooperation is searched. Since the two projectors are coupled to each other with the LAN cable 85 (FIG. 1) as described above, the projector 100*b* is searched by the network search, and is recognized as the secondary projector. It should be noted that when the secondary projector is failed to be found out due to a failure in cable connection or the like, an image including a content that "No projector for tiling has found out. Please check the network connection." is displayed to prompt a check of the connection.

Figure 11:
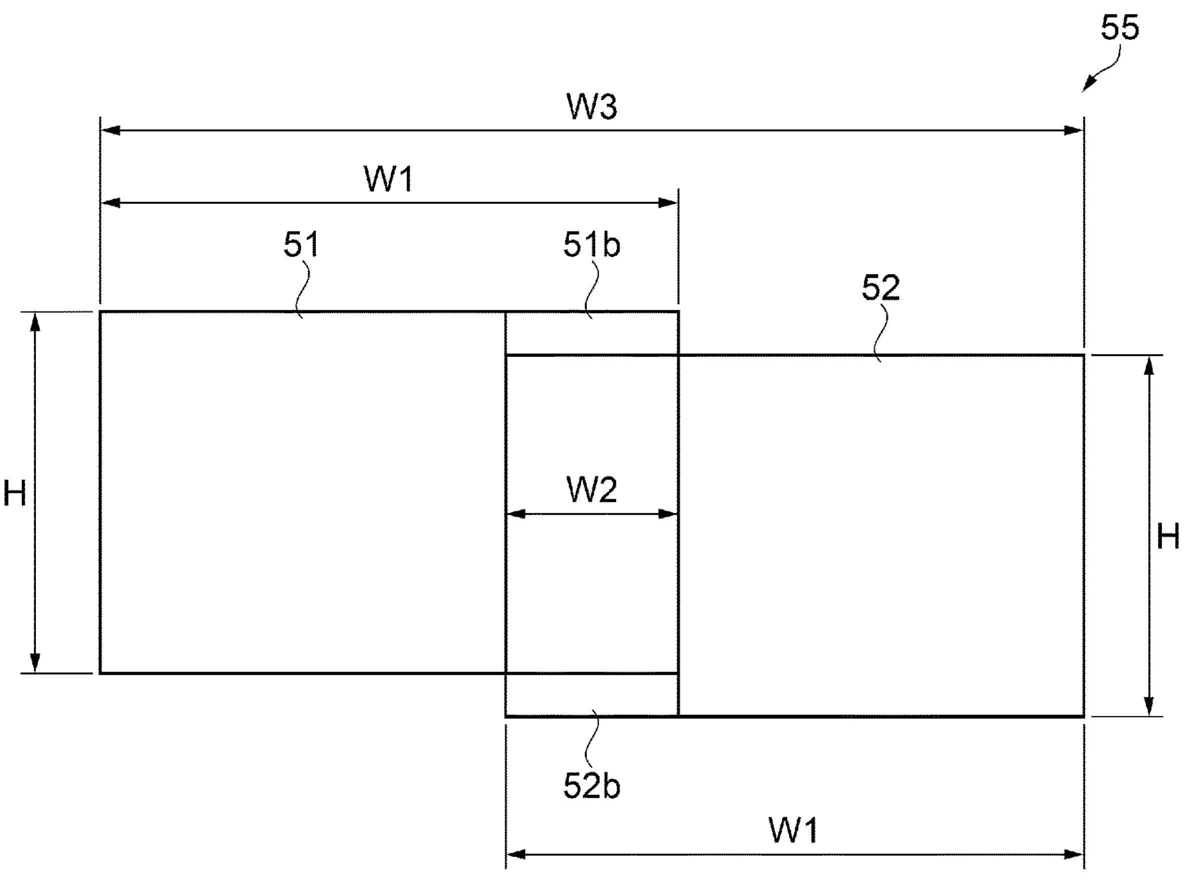
FIG. 11 is a plan view showing a dimensional relationship of the combined image.

FIG. 11 is a plan view showing a dimensional relationship of the combined image. FIG. 12 is a list showing a correlative relationship between the combination aspect ratio and the blend width.

When the secondary projector is recognized due to the search, the calculation of the blend width suitable for the aspect ratio of the combined screen is performed.

In FIG. 11, the resolution of the first image 51 by the projector 100*a* is according to the resolution of the light modulation device, and is represented by the resolution of the liquid crystal panel constituting the light modulation device. The resolution of the light modulation device of either one of the projector 100*a* and the projector 100*b* will hereinafter be described as reference panel resolution. In particular, as shown in FIG. 12, the reference panel resolution of the first image 51 is expressed as, for example, 1920 pixels in reference panel width W1, and 1200 pixels in reference panel height H. It should be noted that the same applies to the resolution of the second image 52 by the projector 100*b*, and the resolution is expressed as 1920 pixels in reference panel width W1, and 1200 pixels in reference panel height H. The description will hereinafter be presented assuming the size (the width and the height) of the first image 51 as the reference panel width W1 and the reference panel height H.

In FIG. 11, an overlapping area with the second image 52 in the first image 51 is defined as a strip pattern 51*b*. The strip pattern 51*b* is disposed at the right end of the first image 51, and the width of the strip pattern 51*b* corresponds to the blend width W2. Similarly, an overlapping area with the first image 51 in the second image 52 is defined as a strip pattern 52*b*. The strip pattern 52*b* is disposed at the left end of the second image 52, and the width of the strip pattern 52*b* corresponds to the blend width W2 on the same grounds as in the strip pattern 51*b*. Further, in FIG. 11, the height of the second image 52 is lowered to a level lower than that of the first image 51 in order to make the two images easy to distinguish, but in reality, the two images are uniform in height.

Further, the width of the combined image 55 obtained by combining the first image 51 and the second image 52 with each other is defined as a combined screen width W3. The combined screen width W3 and the blend width W2 are obtained by Formula (1) and Formula (2) described below.

$$(\text{combined screen width } W3) = ((\text{reference panel height } H)/(EDID \text{ height } EH)) * (EDID \text{ width } EW) \quad \text{Formula (1)}$$

$$(\text{blend width } W2) = ((\text{reference panel width } W1) * 2) - (\text{combined screen width } W3) \quad \text{Formula (2)}$$

It should be noted that regarding the EDID height EH and the EDID width EW, see a table 61 shown in FIG. 12.

For example, when the combination aspect ratio of 21:9 (3440×1440) is selected, the combined screen width W3 becomes (1200/1440)*3440=2866 pixels from Formula (1).

From Formula (2), the blend width W2 is obtained as (1920*2)−2866=974 pixels. It should be noted that the EDID width EW and the EDID height EH are numerical values compliant with the EDID standard.

The table 61 shown in FIG. 12 is a list showing a correlative relationship between the combination aspect ratio, and the combined screen width W3 and the blend width W2, and describes the combined screen width W3 and the blend width W2 in other combination aspect ratios shown in the image 47 of FIG. 8. It should be noted that in either of the combination aspect ratios, the combined screen height becomes the same as the reference panel height H.

In the step S15, the projection is performed so that the strip pattern 51*b* is superimposed on the first image 51, and the strip pattern 52*b* is superimposed on the second image 52. Further, in addition, an image 60 shown in FIG. 10 is projected so as to be superimposed on the first image 51. The state on this occasion is shown in FIG. 1.

Here, the color of the strip pattern 51*b* and the color of the strip pattern 52*b* are different from each other. In a preferred example, magenta is used as the color of the strip pattern 51*b* as a first color, and green is used as the color of the strip pattern 52*b* as a second color. Therefore, white is used as a color of a portion where the strip pattern 51*b* and the strip pattern 52*b* overlap each other. It should be noted that the colors are not a limitation, and any colored light beams in which when the first color and the second color are superimposed on each other, a white color is formed, may be used.

It should be noted that the first image 51 including the strip pattern 51*b* representing the width of the overlapping area is also referred to as a third image. Similarly, the second image 52 including the strip pattern 52*b* representing the width of the overlapping area is also referred to as a fourth image. In other words, the first color used in the strip pattern 51*b* representing the width of the overlapping area in the third image and the second color used in the strip pattern 52*b* representing the width of the overlapping area in the fourth image are different from each other. Further, the first color and the second color form the white color when being displayed in a superimposed manner.

In the image 60 shown in FIG. 10, a sentence that "(1) PLEASE ADJUST POSITIONS SO THAT A GREEN PATTERN AND A MAGENTA PATTERN OVERLAP EACH OTHER. THE OVERLAPPING PORTION TURNS TO A WHITE PATTERN." and a sentence that "(2) WHEN THE ALIGNMENT IS COMPLETED, PLEASE PRESS "YES."" are described.

In the step S16, an alignment adjustment of the combined image is performed. In particular, the user operates the remote controller 3 to perform an adjustment so that the strip pattern 51*b* and the strip pattern 52*b* are superimposed on each other to form the white color. As the adjustment, it is possible to use the zoom adjustment, the focus adjustment, the distortion correction, and the lens shift adjustment. It should be noted that it is not required to perform all of the adjustments, and it is sufficient to perform necessary adjustment(s) in accordance with the state of the combined image 55.

Figure 13:
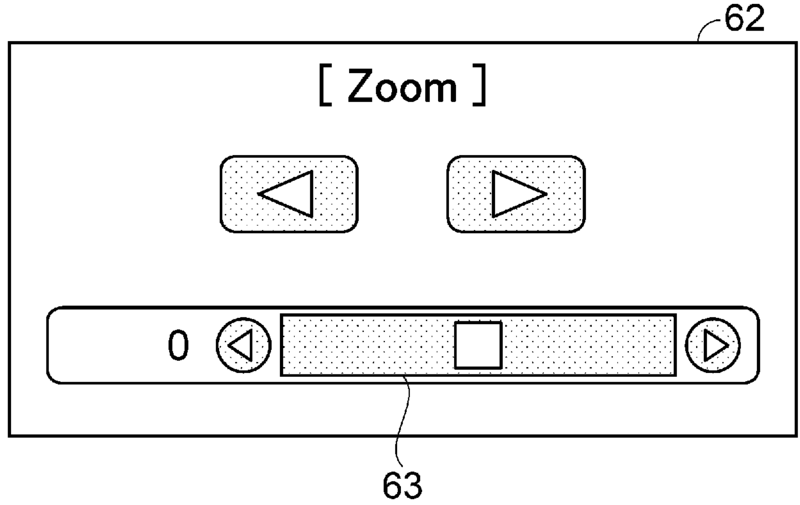
FIG. 13 is a diagram showing an aspect of a screen for an adjustment in a zoom adjustment.

FIG. 13 is a diagram showing an aspect of a screen for an adjustment in the zoom adjustment. FIG. 14 is a diagram showing an aspect of a screen for an adjustment in the lens shift adjustment.

For example, when performing the zoom adjustment of the first image 51, an expansion and a contraction are performed using the zoom key 36 of the remote controller 3. Further, when the OSD function is set to an ON state, since an image 62 shown in FIG. 13 is displayed, it is possible to perform the zoom adjustment using the image 62. Since a bar-shaped indicator 63 is displayed in the image 62, it is possible to check a zoom degree. Further, when performing the focus adjustment, the expansion and the contraction are performed using the focus key 37 of the remote controller 3. Further, also in the focus adjustment, when the OSD function is set to the ON state, since the screen for the focus adjustment similar to the image 62 shown in FIG. 13 is displayed, it is possible to perform the focus adjustment using that image. Further, when performing the distortion correction, the distortion correction is performed using the distortion correction key 38 of the remote controller 3.

Further, when performing the lens shift adjustment of the first image 51, the lens shift key 39 of the remote controller 3 is held down. When the lens shift key 39 is operated, the image 64 shown in FIG. 14 is displayed. It is possible for the user to move the first image 51 using the selection key 33 of the remote controller 3, or arrow buttons in the image 64. Further, since a bar-shaped indicator 65 is displayed in the image 64, it is possible to check a moving distance in each of the vertical direction and the horizontal direction.

It should be noted that when performing the adjustment of the second image 52, it is possible to perform substantially the same adjustment using the remote controller 3 for the projector 100*b*.

Going back to FIG. 10, when the alignment adjustment of the combined image is completed, the user operates the selection key 33 of the remote controller 3 to select the "YES" button in the image 60 shown in FIG. 10, and then holds down the decision key 34. Thus, the adjustment of the combined screen is complete.

In other words, according to the display method including the adjustment of the combined image, there are included receiving the selection of the aspect ratio of the projection range when performing the tiling projection of the first image 51 projected using the projector 100*a* as the first projector, and the second image 52 projected using the projector 100*b* as the second projector, determining the blend width W2 as the width of the overlapping area of the first image 51 and the second image 52 based on the aspect ratio, making the projector 100*a* project the third image including the strip pattern 51*b* representing the width of the overlapping area, and making the projector 100*b* project the fourth image including the strip pattern 52*b* representing the width of the overlapping area.

Figure 15:
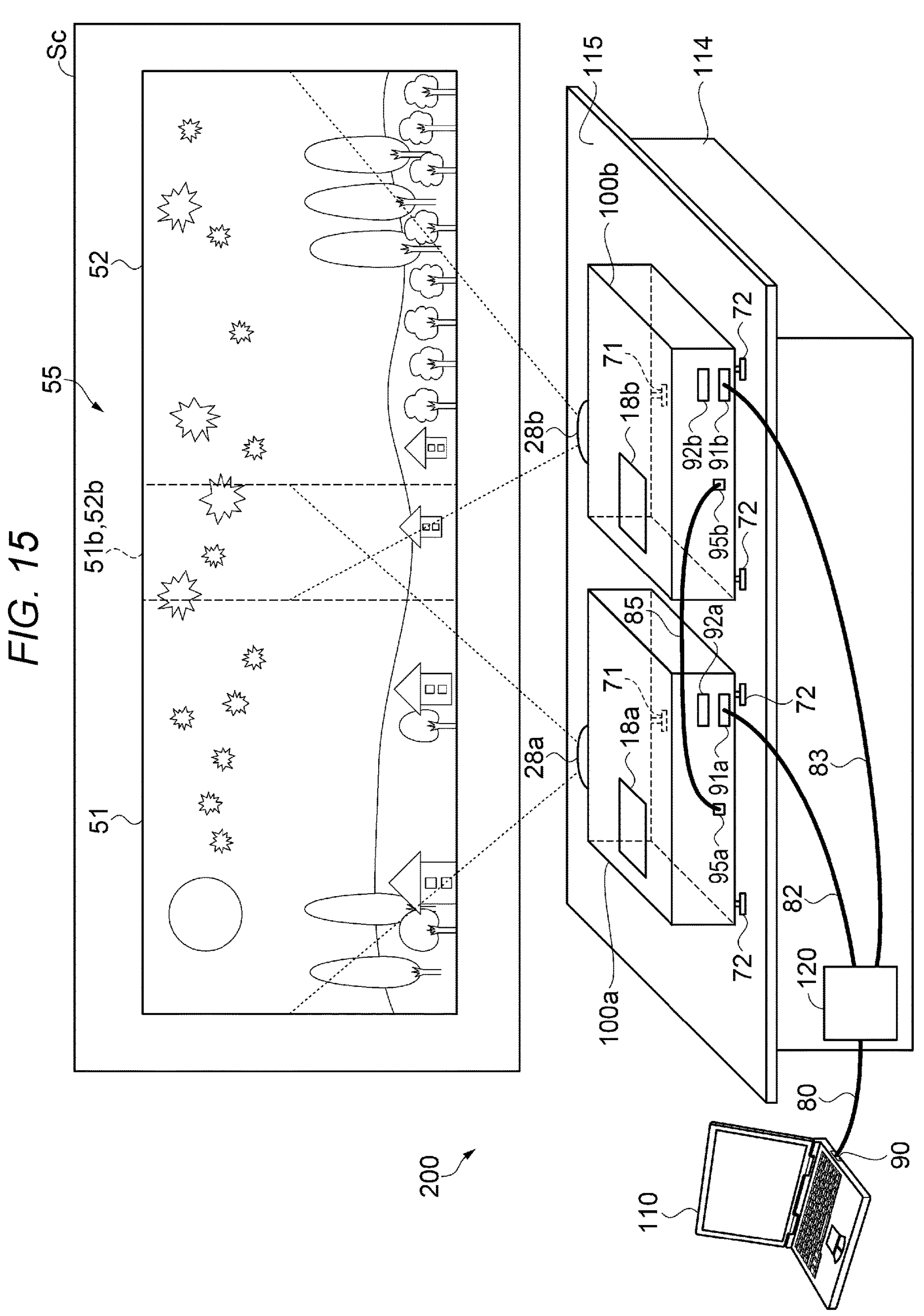
FIG. 15 is a diagram showing an aspect of a combined image having been adjusted.

FIG. 15 is a diagram showing an aspect of the combined image having been adjusted.

As shown in FIG. 15, the combined image 55 having been adjusted has become a landscape tiling projection image which is seamless and does not cause a feeling of strangeness. The strip pattern 51*b* and the strip pattern 52*b* perfectly overlap each other to form a part of the combined image 55.

Further, in the above description, there is presented the explanation assuming that the projector 100*a* and the projector 100*b* are coupled to each other with the HDMI cable 81 (FIG. 1) to form the daisy chain connection, but this configuration is not a limitation. For example, it is possible to adopt a configuration in which an image signal distributor 120 is disposed between the computer 110, and the projectors 100*a*, 100*b* as shown in FIG. 15. In this case, the computer 110 and the image signal distributor 120 are coupled to each other with the HDMI cable 80. Further, the image signal distributor 120 and the projector 100*a* are coupled to each other with an HDMI cable 82, and the image signal distributor 120 and the projector 100*b* are coupled to each other with an HDMI cable 83. Even in this wiring aspect, it is possible to perform the adjustment of the combined image similarly to the above, and it is possible to easily obtain the landscape tiling projection image which is seamless and does not cause a feeling of strangeness.

Further, in the above description, the method of adjusting the combined image for obtaining the combined image 55 as the landscape tiling projection image is described, but this is not a limitation, and it is possible to apply this adjustment method to, for example, a tiling projection image in which the first image 51 and the second image 52 are vertically combined with each other. In this case, the strip pattern is displayed along a long side at the lower side of the first image 51, and at the same time, the strip pattern is displayed along a long side at the upper side of the second image 52. Further, similarly to the above, it is sufficient to overlap the two strip patterns with each other. In this case, the position information includes, for example, the information that the projector A is arranged at the first row and the A-th column shown in FIG. 7, and the projector B is arranged at the second row and the A-th column.

In other words, according to the display method including the adjustment of the combined image, the position information of designating the positional relationship between the first image 51 and the second image 52 in the tiling projection is received, the strip pattern representing the width of the overlapping area is arranged so as to have contact with either one of the four sides of the third image, and the strip pattern representing the width of the overlapping area is arranged so as to have contact with either one of the four sides of the fourth image based on the position information.

As described hereinabove, according to the display method, the projectors 100*a*, 100*b*, and the program related to the present embodiment, the following advantages can be obtained.

According to the display method including the adjustment of the combined image, there are included receiving the selection of the aspect ratio of the projection range as an example of the information representing the size of the projection range when performing the tiling projection of the first image 51 projected using the projector 100*a* as the first projector and the second image 52 projected using the projector 100*b* as the second projector, determining the blend width W2 as the width of the overlapping area of the first image 51 and the second image 52 based on the aspect ratio, making the projector 100*a* project the third image including the strip pattern 51*b* representing the width of the overlapping area, and making the projector 100*b* project the fourth image including the strip pattern 52*b* representing the width of the overlapping area.

According to this method, when the information representing the size of the projection range in the tiling projection is selected, the blend width W2 is automatically determined with the calculation based on that information. For example, when the aspect ratio of the projection range as the information representing the size of the projection range is selected, the blend width W2 is automatically determined with the calculation based on that aspect ratio. Further, since the strip pattern 51*b* having the blend width W2 calculated is displayed in the first image 51, and the strip pattern 52*b* having the blend width W2 calculated is displayed in the second image 52, by overlapping the strip pattern 51*b* and the strip pattern 52*b* with each other, it is possible to obtain the combined image 55 as a seamless image. In particular, unlike the related-art method in which the designation of the blend width by the user is necessary, since it is sufficient to select only the information representing the size of the projection range such as the aspect ratio in the tiling projection, it is possible even for an ordinary user who does not have the knowledge related to the blend width to easily perform the tiling projection.

Therefore, it is possible to provide the display method capable of easily achieving the display setup of the tiling projection.

Further, the first color to be used in the strip pattern 51*b* representing the width of the overlapping area in the third image and the second color to be used in the strip pattern 52*b* representing the width of the overlapping area in the fourth image are different from each other.

According to the above, since the two strip patterns 51*b*, 52*b* are projected with the respective colors different from each other, it becomes easy for the user to identify an amount of the overlap, and thus, the alignment of the combined image 55 becomes easy.

Further, the first color and the second color form the white color when being displayed in a superimposed manner.

According to the above, since the color of the portion where the two strip patterns 51*b*, 52*b* overlap each other turns to white, and it is easy to visually recognize the overlapping condition, and the alignment of the combined image 55 becomes easy.

Further, according to the display method including the adjustment of the combined image, there are included receiving the position information for designating the positional relationship between the first image 51 and the second image 52 in the tiling projection, arranging the pattern representing the width of the overlapping area in the third image along one side overlapping the fourth image out of the four sides of the third image based on the position information, and arranging the pattern representing the width of the overlapping area in the fourth image along one side overlapping the third image out of the four sides of the fourth image.

According to the above, it is possible to display the two strip patterns representing the blend width at appropriate positions even in either of the landscape tiling projection and the portrait tiling projection. Therefore, by overlapping the two strip patterns with each other, it is possible to obtain the seamless combined image.

Therefore, it is possible to provide the display method capable of easily achieving the display setup of the tiling projection.

Further, the projector 100*a* includes the optical device 28, and the controller 10 including at least one processor, wherein the controller 10 including at least one processor executes receiving the selection of the aspect ratio of the projection range as an example of the information representing the size of the projection range when performing the tiling projection by combining the first image 51 and the second image 52 projected using the projector 100*b* as another projector, determining the width of the overlapping area of the first image 51 and the second image 52 based on the aspect ratio, and displaying the third image including the pattern representing the width of the overlapping area by controlling the optical device 28.

According to the above, it is possible to provide the projector 100*a* capable of easily achieving the display setup of the tiling projection. Further, it is possible to provide the image projection system 200 capable of easily achieving the display setup of the tiling projection.

Further, according to the adjustment program of the combined image, the computer including the controller 10 and the storage 11 is made to execute receiving the selection of the aspect ratio of the projection range as an example of the information representing the size of the projection range when performing the tiling projection of the first image 51 projected using the projector 100*a* as the first projector and the second image 52 projected using the projector 100*b* as the second projector, determining the blend width W2 as the width of the overlapping area of the first image 51 and the second image 52 based on the aspect ratio, making the projector 100*a* project the third image including the strip pattern 51*b* representing the width of the overlapping area, and making the projector 100*b* project the fourth image including the strip pattern 52*b* representing the width of the overlapping area.

According to the above, it is possible to provide the program capable of easily achieving the display setup of the tiling projection.

Conclusion of Present Disclosure

Hereinafter, the conclusion of the present disclosure will supplementarily be noted.

Supplementary Note 1

A display method includes receiving selection of information representing a size of a projection range when performing tiling projection of a first image projected using a first projector and a second image projected using a second projector, projecting a third image including a pattern representing a width of an overlapping area based on the information representing the size of the projection range using the first projector, and projecting a fourth image including a pattern representing the width of the overlapping area using the second projector.

According to this method, when the aspect ratio of the projection range in the tiling projection is selected, the width of the overlapping area is automatically determined with the calculation based on that aspect ratio. Further, since the pattern representing the width of the overlapping area calculated for each of the first image and the second image is displayed, it is possible to realize the tiling projection by overlapping the two patterns with each other. In particular, unlike the related-art method in which the designation of the width of the overlapping area by the user is necessary, since the width of the overlapping area is determined with the calculation when selecting the aspect ratio in the tiling projection, it is possible even for an ordinary user who does not have the knowledge related to the width of the overlapping area to easily perform the tiling projection.

Supplementary Note 2

The display method described in Supplementary Note 1, wherein a first color used in the pattern representing the width of the overlapping area in the third image and a second color used in the pattern representing the width of the overlapping area in the fourth image are different from each other.

According to the above, since the two patterns are projected with respective colors different from each other, it becomes easy for the user to identify an amount of the overlap, and thus, the alignment of the tiling projection becomes easy.

Supplementary Note 3

The display method described in Supplementary Note 2, wherein the first color and the second color form a white color when being displayed in a superimposed manner.

According to the above, since the color of the portion where the two patterns overlap each other turns to white, and it is easy to visually recognize the overlapping condition, the alignment of the tiling projection becomes easy.

Supplementary Note 4

The display method described in any one of Supplementary Note 1 through Supplementary Note 3 further including receiving position information designating a positional relationship between the first image and the second image in the tiling projection, arranging the pattern representing the width of the overlapping area in the third image along one side overlapping the fourth image out of four sides of the third image based on the position information, and arranging the pattern representing the width of the overlapping area in the fourth image along one side overlapping the third image out of four sides of the fourth image.

According to the above, it is possible to display the two patterns representing the width of the overlapping area at appropriate positions even in either of the landscape tiling projection and the portrait tiling projection. Therefore, by overlapping the two patterns with each other, it is possible to perform the seamless tiling projection.

Therefore, it is possible to provide the display method capable of easily achieving the display setup of the tiling projection.

Supplementary Note 5

A projector including an optical device, and at least one processor, wherein the at least one processor is configured to execute receiving selection of information representing a size of a projection range when performing tiling projection by combining a first image and a second image projected using another projector, and displaying a third image including a pattern representing a width of an overlapping area based on the information representing the size of the projection range by controlling the optical device.

According to the above, it is possible to provide a projector capable of easily setting the width of the overlapping area in the tiling projection.

Supplementary Note 6

A non-transitory computer-readable storage medium storing a program configured to cause a computer to execute processing including receiving selection of information representing a size of a projection range when performing tiling projection of a first image projected using a first projector and a second image projected using a second projector, causing the first projector to project a third image including a pattern representing a width of an overlapping area based on the information representing the size of the projection range, and causing the second projector to project a fourth image including a pattern representing the width of the overlapping area.

According to the above, it is possible to provide a program capable of easily setting the width of the overlapping area in the tiling projection.

What is claimed is:

1. A display method comprising:

receiving selection of information representing a size of a projection range when performing tiling projection of a first image projected using a first projector and a second image projected using a second projector;

projecting a third image including a pattern representing a width of an overlapping area based on the information representing the size of the projection range using the first projector; and projecting a fourth image including a pattern representing the width of the overlapping area using the second projector, wherein a first color used in the pattern representing the width of the overlapping area in the third image and a second color used in the pattern representing the width of the overlapping area in the fourth image are different from each other.

2. The display method according to claim 1, wherein the first color and the second color form a white color when being displayed in a superimposed manner.

3. The display method according to claim 1, further comprising:

receiving position information designating a positional relationship between the first image and the second image in the tiling projection;

arranging the pattern representing the width of the overlapping area in the third image along one side overlapping the fourth image out of four sides of the third image based on the position information; and arranging the pattern representing the width of the overlapping area in the fourth image along one side overlapping the third image out of four sides of the fourth image.

4. A projector comprising:

an optical device; and at least one processor, wherein the at least one processor is configured to execute receiving selection of information representing a size of a projection range when performing tiling projection by combining a first image and a second image projected using another projector, and displaying a third image including a pattern representing a width of an overlapping area based on the information representing the size of the projection range by controlling the optical device, wherein a first color used in the pattern representing the width of the overlapping area in the third image and a second color used in the pattern representing the width of the overlapping area in a fourth image that includes a pattern representing the width of the overlapping area using the another projector are different from each other.

5. A non-transitory computer-readable storage medium storing a program configured to cause a computer to execute processing comprising:

receiving selection of information representing a size of a projection range when performing tiling projection of a first image projected using a first projector and a second image projected using a second projector;

causing the first projector to project a third image including a pattern representing a width of an overlapping area based on the information representing the size of the projection range; and causing the second projector to project a fourth image including a pattern representing the width of the overlapping area, wherein a first color used in the pattern representing the width of the overlapping area in the third image and a second color used in the pattern representing the width of the overlapping area in the fourth image are different from each other.

* * * * *